Jan. 17, 1967     R. H. ALEXANDER     3,298,284
SERVO OPERATED REVERSING TOOL
Filed Sept. 11, 1964     2 Sheets-Sheet 1
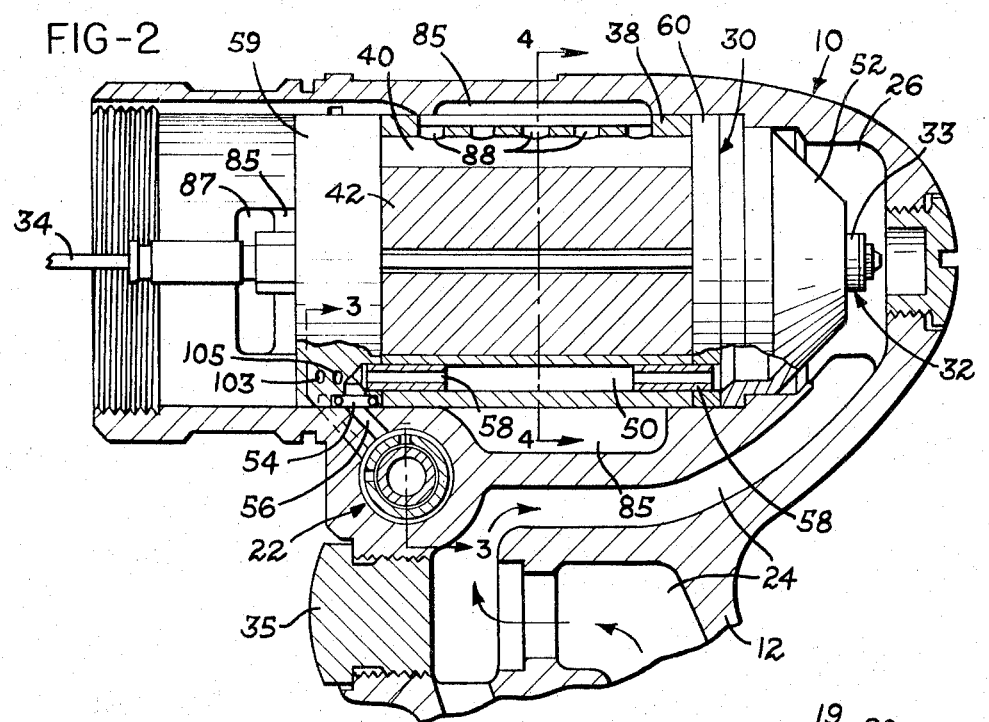
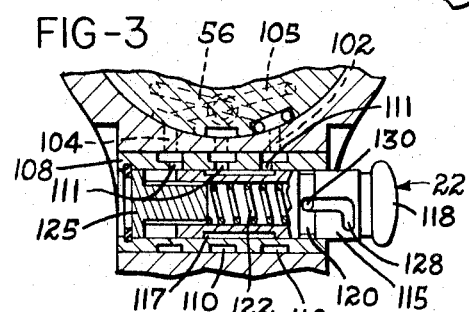
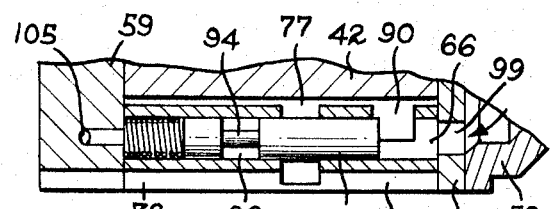
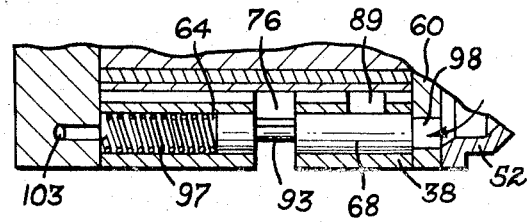
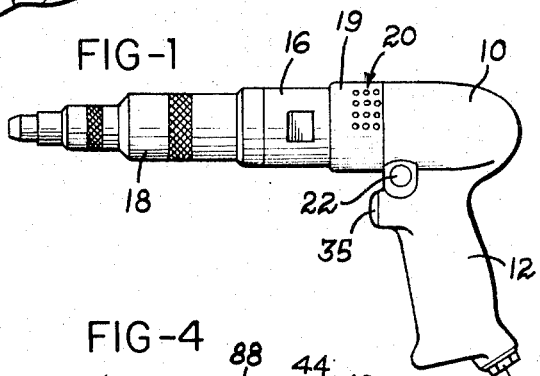
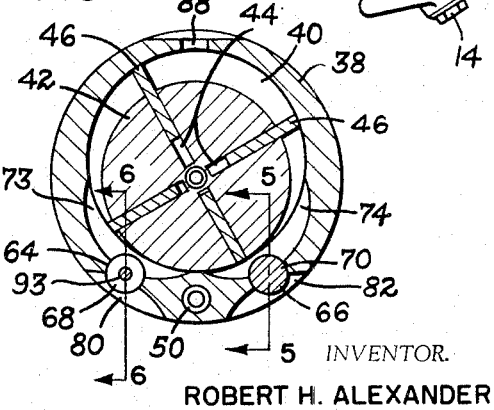
INVENTOR.
ROBERT H. ALEXANDER
BY Marechal, Biebel, French & Bugg
ATTORNEYS Jan. 17, 1967   R. H. ALEXANDER   3,298,284
SERVO OPERATED REVERSING TOOL
Filed Sept. 11, 1964   2 Sheets-Sheet 2
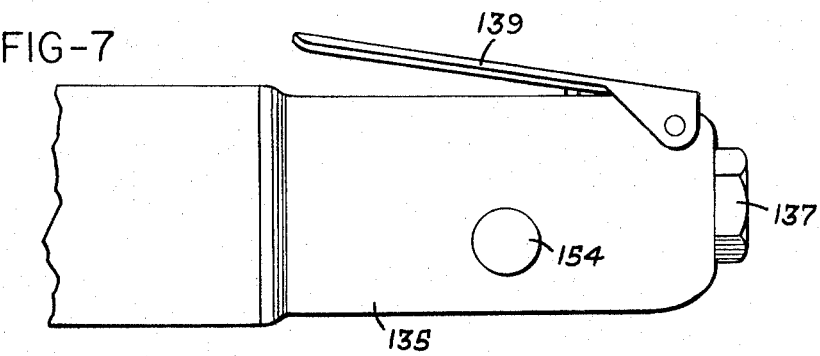
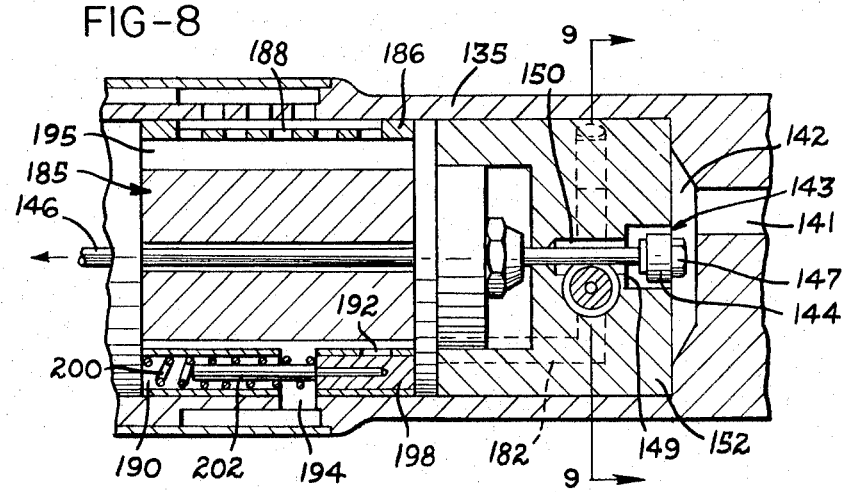
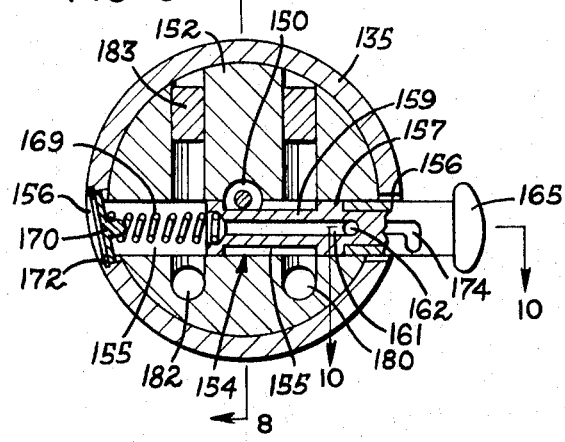
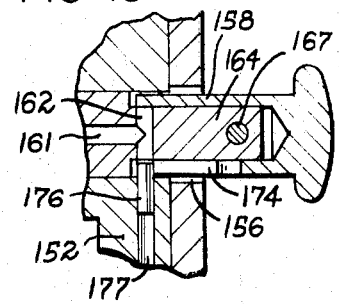
INVENTOR.
ROBERT H. ALEXANDER
BY
Marechal, Biebel, French & Bugg
ATTORNEYS United States Patent Office 3,298,284
Patented Jan. 17, 1967

3,298,284
SERVO OPERATED REVERSING TOOL
Robert H. Alexander, Dayton, Ohio, assignor to Rockwell Manufacturing Company, Pittsburgh, Pa., a corporation of Pennsylvania
Filed Sept. 11, 1964, Ser. No. 395,824
8 Claims. (Cl. 91—58)

This invention relates to power tools, and more particularly, to a fluid operated rotary power tool having a novel valve system for reversing the motor.

The power tool according to the present invention is especially useful for driving screws, nut running, tapping, and the like, where it is frequently necessary to reverse the tool bit in order to remove the screw, nut or tap. Primarily, the power tool according to the invention is directed to a portable tool which is adapted to be gripped conveniently in one hand such that the operator can easily change the direction of rotation of the tool without changing his grip or requiring the use of his other hand.

Accordingly, it is a primary object of the present invention to provide a fluid operated portable power tool having a reversible motor with a novel servo operated valve system for changing the direction of rotation of the motor by a slight touch of a conveniently located push button reverse valve.

As another object, the present invention provides a power operated hand tool having a reversible rotary fluid motor and a handle which can be conveniently gripped in one hand with a novel servo operated valve system for reversing the motor and including a control button which can be easily operated by the same hand supporting the tool without changing the grip.

Another object of the present invention is to provide a fluid operated reversing tool as outlined above which includes a pair of pilot valves, one for each direction of rotation, which automatically controls the inlet and recompression exhaust ports leading to and from the rotary motor and are adapted to cooperate with the main exhaust ports in order to obtain maximum power from the motor.

A further object of the present invention is to provide a fluid operated power tool having a reversible motor including an outer cylinder in which a pair of axially extending pilot valves can be easily assembled prior to assembling the motor within the tool housing.

It is also an object of the invention to provide a power tool as outlined above wherein the control valve system for reversing the motor is located downstream of an automatic start valve so as to eliminate the chance for fluid to seep past the valve system when the tool is not in use but connected to the fluid supply line.

Other objects and advantages of the invention will be apparent from the following description, the accompanying drawing and the appended claims.

In the drawing:

FIG. 1 is a perspective view of a typical portable fluid operated power tool which incorporates a reversing motor and a servo valve system for controlling the direction of rotation of the motor in accordance with the invention;

FIG. 2 is an enlarged detailed view in axial section showing the spaced relationship among the motor, the housing including the fluid supply conduit, and the thumb-operated reverse valve;

FIG. 3 is a sectional view through the push button reverse valve and the surrounding housing showing the fluid passageways connecting the push button valve to the pair of pilot valve chambers formed within the outer cylinder of the motor, as viewed along the line 3—3 of FIG. 2;

FIG. 4 is a cross sectional view of the fluid operated vane-type motor showing the relationship between the two pilot valves which are assembled in the outer cylinder of the motor, as viewed along the line 4—4 of FIG. 2;

FIG. 5 is a view in axial section of the right hand rotation pilot valve showing the left hand recompression exhaust port closed and the right hand inlet port open for receiving supply fluid, as viewed along the line 5—5 of FIG. 4;

FIG. 6 is a section view of the left hand rotation pilot valve showing the right hand recompression exhaust port open and the left hand inlet port closed, as viewed along the line 6—6 of FIG. 4;

FIG. 7 is an elevational view of the rear portion of the housing for an in-line or straight portable power tool which incorporates a reversing motor and a valve system for controlling the direction of rotation of the motor in accordance with another embodiment of the invention;

FIG. 8 is an enlarged sectional view of the tool taken along the line 8—8 of FIG. 9, showing a modified valve arrangement used to selectively reverse the direction of the motor;

FIG. 9 is a cross section view of the straight tool showing the push button reversing valve and its interconnecting passageways as viewed along the line 9—9 of FIG. 8; and FIG. 10 is an enlarged detail section of the head portion of the push button reversing valve as viewed along the line 10—10 of FIG. 9.

Referring to the drawings, which illustrate a preferred embodiment of the present invention, FIG. 1 shows a typical portable fluid operated tool which is adapted to employ a reversing vane-type motor and valve control system in accordance with the present invention. In general, the power tool includes a housing 10 which includes a handle portion 12 to which a suitable fluid supply line is connected at the fitting 14. Mounted within the forward end of the housing 10 is a planetary gearing unit 16 which reduces the high speed rotary output of the fluid motor to a substantially lower speed usable for driving screws, nuts, and the like. Mounted to the end of the gear reduction unit 16 is a torque control clutch 18 which is adapted to stop the motor when the tool bit arrives at a predetermined torque resistance. The operation of this torque control clutch is shown and described in the copending application S.N. 214,293, filed June 21, 1962 and assigned to the same assignee as the present application. Surrounding the forward end of the housing 10 is a rotatable cylindrical shield 19 in which a series of openings 20 are provided for adjustably directing the exhaust fluid upward away from the handle portion 12.

Conveniently located within the housing 10 and above the handle portion 12 is a push button pilot valve 22 which operates as a servo control valve for reversing the direction of rotation of the tool bit. The valve 22 is located at the position shown in FIG. 1 so that it may be actuated by the thumb of the right hand which normally grips the handle 12. Formed within the housing 10 and extending through the handle portion 12 is a fluid supply conduit 24 through which fluid can flow from the supply line to the chamber 26 formed within the rear of the housing 10. At the rear end of the fluid operated motor, generally referred to as 30, is a plunger type start valve 32 including a resilient washer 33 which is moved axially by the rod 34 extending rearwardly from the torque control clutch mentioned above. The start valve is opened and closed automatically in response to the operation of the torque control clutch. In place of the automatic start valve shown, the tool may be provided with a trigger operated start valve (not shown) which can be inserted within the threaded opening in place of the plug 35.

The fluid operated rotary motor shown includes an outer cylinder 38 in which the cylindrical chamber 40 is eccentrically formed as shown in FIG. 4. Rotatably mounted within the chamber 40 is a rotor 42 having equally spaced slots 44 which are adapted to receive the sliding vanes 46.

Extending axially within the cylinder 38, at the bottom center thereof, is a passageway 50 which is provided to conduct fluid from within the end cover 52 to the port 54 which connects with the passageway 56 in order to supply fluid at line pressure to the push button reverse valve 22, after the start valve 32 is opened. The hollow pins 58 extend outwardly from each end of the passageway 50 in order to engage corresponding openings within the front end plate 59 and rear end plate 60 of the motor 30 and to maintain alignment therebetween.

As shown in FIGS. 4, 5 and 6, the motor cylinder 38 has formed within the bottom portion two axially extending valve chambers 64 and 66 in which are slidably mounted the plunger type valve members 68 and 70, respectively. Formed into the internal surface of the cylinder 38, and spaced substantially midway between the ends of the cylinder, are a pair of cavities 73 and 74 which intersect with the valve chambers 64 and 66 in order to define recompression exhaust ports 76 and 77.

Formed continuously along the underneath surface of the cylinder 38 are a pair of curved shaped slots 80 and 82 which are provided to enable the exhaust fluid to flow from the internal cavities 73 and 74 through the exhaust ports 76 and 77 in order to exhaust through the chamber 85 (FIG. 2) formed within the housing 10 around the motor 30 so that the fluid can exit through the opening 87 and out through the series of openings 20 within the shield 19. The main exhaust ports 88 are provided along the top of the cylinder 38 to provide for an escape of the fluid at the point of maximum expansion.

Spaced close to the rear end of the valve chambers 64 and 66 are the inlet ports 89 and 90 which connect the chambers 64 and 66 with the motor chamber 40 on opposite sides of the rotor 42. As shown in FIGS. 4 and 5, the valve members 68 and 70 include a neck portion 93 and 94, respectively, which enable the recompressed fluid to flow through the exhaust ports 76 and 77 to the exhaust chamber 85 when the neck portion is aligned with its respective exhaust port.

Spaced between the forward end of each of the valve members 68 and 70 and the front end plate 59 is a compression spring 97 which acts as a bias means to urge the valve member rearwardly in order to close the inlet ports 89 and 90. The springs 97 are selected to exert a predetermined force against the end of the valve member 68 and 70 such that the valve members will be positioned rearwardly as shown in FIG. 6 when the start valve 32 is closed. However, when the start valve 32 is opened and fluid flows into the end cover 52 and through the openings 98 and 99 formed within the rear end plate 60, the springs 97 are adapted to yield as the pressure of the fluid is exerted against the opposite ends of the valve members 68 and 70. If this was permitted to happen, it can be seen that both of the inlet ports 89 and 90 would be open and fluid could flow into each side of the rotor 42 and, of course, would produce no rotation.

It is the function of the push button reverse valve 22 to receive fluid from the passageway 56 and to direct the controlling or servo fluid through either the passageways 102 and 103 or through the passageways 104 and 105 depending on the position of the push button valve 22. As illustrated in FIG. 6, when fluid, at supply line pressure, is introduced into the passageway 103, the fluid assists the spring 97 and exerts a force against the end of the valve member 68 which is equivalent to the fluid pressure on the opposite end of the valve member. Thus, since the fluid pressure on opposite ends of the valve member 68 is balanced, the spring 97 forces the valve member 68 rearwardly to close the inlet port 89 and open the recompression exhaust port 76, for right hand rotation.

As shown in FIG. 3, the push button valve 22 includes a cylindrical sleeve 108 having a series of annular grooves 110 formed around its outer periphery and includes a series of openings 111 which connect the grooves for fluid communication with the interior of the sleeve 108. The plunger 115 which is slidably mounted within the sleeve 108 includes a wide groove 117 formed around the outer periphery of the plunger 115 so as to connect the center inlet passageway 56 with either the passageway 102, as shown in FIG. 3 where the push button 118 is extended or with the passageway 104 when the push button 118 is depressed inwardly. It thus can be seen that the push button valve 22 serves as a servo pilot valve for controlling the position of the valve member 68 and 70.

The plunger 115 is further provided with a narrow groove 120 formed around the outer periphery which is adapted to align with a passageway 111 leading from the passageway 102 when the plunger 115 is depressed inwardly and thereby exhaust the passageways 102 and 103 which, in turn, exhausts the valve chamber 64 in order to allow member 68 to move forward and open the inlet port 89 when left hand rotation is desired. Likewise, when the plunger 115 is forced outwardly by the spring 122, the passageways 105 and 104 are exhausted by the clearance provided around the spring retaining plug 125 and the inside diameter of the hollow plunger 115 which allows the valve chamber 66 to exhaust through the plunger 115 and exit through the bayonet slot 128 formed within the side wall of plunger 115. The end of the bayonet slot 128 extends into the groove 120 so that fluid may escape from the passageway 102 through the bayonet slot 128 when the plunger 115 is pushed inwardly. A pin 130 is mounted radially within the sleeve 108 and extends into the bayonet slot 128 so as to limit the travel of the plunger 115 and further to provide a means for locking the plunger in the depressed inward position where the passageway 56 is in fluid communication with the passageway 104 for left hand rotation. Thus, the position of the push button valve 22 determines which one of the valve members 68 or 70 will receive a balancing fluid pressure on the forward end which causes the valve member to close its respective inlet port.

As a result of the loose sliding fit of the valve members 68 and 70 within their respective valve chambers 64 and 66, it is possible for fluid to seep between the valve members and the valve chambers from the rearward end of the valve members to the forward end when the valve member is in the position shown in FIG. 5. It is therefore important that the passageway 105 is open to atmosphere through the push button valve 22, as explained above, in order to prevent pressure from developing in the valve chamber in front of the valve member 70 and causing the valve member 70 to close the inlet port 90.

In operation, substantially all of the fluid which enters the motor through the inlet ports will be exhausted from the motor through the top exhaust port 88. However, as can be seen in FIG. 4, the vanes 46 will trap air once the vanes have moved past the top exhaust ports 88 and will thus tend to recompress the air within the chamber 40. For this reason, the recompression exhaust ports 76 and 77 are desirable in order to obtain maximum efficiency of the fluid motor.

It is an important feature of the valve system according to the invention that the entire valve control system is positioned downstream of the automatic start valve 32. As a result, when the power tool is not in use and the start valve 32 is completely closed, it is impossible for fluid to seep around the plunger type valve components, which are not provided with seals, and to produce a hissing sound which is commonly associated with fluid operated power tools and furthermore, prevents the wasting of compressed air.

By controlling the reversing of the motor through a servo system as shown, it becomes apparent that by simply pressing or releasing the push button valve 22 with the thumb, the opening and closing of four separate ports leading to and from the motor are simultaneously controlled. When the inlet port connecting one valve chamber is open, the valve system assures that the recompression exhaust port of the opposite chamber is also open. By this valve arrangement in combination with the top exhaust ports 88, the fluid motor will produce the maximum power.

Referring to another embodiment of the present invention employed within the straight power tool as shown in FIG. 7, the housing 135 is generally cylindrical and includes a suitable fitting 137 mounted on the rear end for receiving a high pressure fluid line. A lever 139 is connected to a spring biased manually operated start and stop valve as shown and described within the copending application S.N. 214,293, filed June 21, 1962, which is assigned to the same assignee as the present application. As explained therein, the valve opens when the lever 139 is depressed by the operator as he grips the tool. The fluid inlet passageway 141, FIG. 8, leads from the manually operated valve and serves to conduct high pressure fluid through the housing to the chamber 142 ahead of the automatic start and stop valve 143 comprising a resilient valve member 144 which is attached to the end of the rod 146 by a suitable nut 147. In FIG. 8, the automatic start valve is shown in the open position whereby the valve member 144 is spaced apart from the seat 149 which allows the high pressure fluid to enter the axially extending passageway 150 formed within the main valve body 152.

Extending laterally through the valve body 152, as shown in FIGS. 8 and 9, is a push button valve 154 comprising a valve chamber 155 which aligns with corresponding openings 156 formed within the housing 135, and intersects with the axially extending passageway 150. Slidably mounted within the valve chamber 155 is a plunger type reversing valve member 157 having a central portion of reduced diameter 159 and defining an internal elongated passageway 161 which connects with a laterally extending passageway 162, as shown in FIG. 10. The valve member 157 further includes a reduced end portion 164 which receives the sleeve 158 of the push button 165 and is retained therein by a cross pin 167.

As shown in FIG. 9, the plunger type valve member 159 is biased outwardly by a compression spring 169 spaced between the end of the valve member 157 and a plug 170 held within the opening 156 by the retaining ring 172. The sleeve 158 of the push button 165 includes a bayonet slot 174 adapted to receive a pin 176 extending from a hole 177 formed within the valve body 152. In this manner, the push button reversing valve 154 is limited in travel and can be locked in the depressed position for reversing the fluid motor in the same manner as was explained above for the reversing valve 22 shown in FIGS. 1 and 3. Thus, as shown in FIG. 9, the high pressure fluid within the passageway 150 can be directed to either the passageway 180 for right hand rotation of the motor or to the passageway 182 for left hand rotation, depending upon the position of the valve member 157. Suitably tight plugs 183 are inserted within the ends of the passageways 180 and 182 to prevent leakage of the high pressure fluid.

The sliding vane-type fluid motor 185, shown in FIG. 8, is substantially the same as the vane-type motor shown in FIGS. 2 and 4, in that, the outer cylinder 186 includes a series of main exhaust openings 188 at the top thereof and a pair of axially extending valve chambers 190. The cylinder 186 also defines a corresponding pair of inlet ports 192 and recompression exhaust ports 194 connecting the motor chamber 195 with each of the valve chambers 190, in the same manner as described above. A valve member 198 is slidably mounted in each of the valve chambers 190 and each is biased by a compression spring 200 surrounding a valve stem 202 so that the valve members 198 are normally positioned rearwardly with both inlet ports 192 closed and both recompression exhaust ports 194 open. The passageways 180 and 182 are connected with their respective valve chambers 190 so that when high pressure fluid is directed to either of the passageways 180 or 182, the corresponding valve member 198 will move forwardly to open the inlet port 192 corresponding to the selected direction of rotation and to close automatically the recompression exhaust port 194 associated with the opposite direction of rotation in a manner similar to that explained above for the operation of the valve system shown in FIGS. 5 and 6.

The purpose of the passageways 161 and 162 is to exhaust alternately either the passageway 180 or 182 whenever the other passageway is connected for receiving high pressure fluid. That is, when the valve member 159 is in the position shown in FIG. 9, high pressure fluid is conducted through the chamber 150 and chamber 155 and into the passageway 182. However, since there is a slight loose sliding fit between the valve member 157 and the chamber 155, high pressure fluid within the chamber 150 can seep past the end of the valve member 159 and into the passageway 180. If this fluid was not allowed to escape, it can be seen that pressure would build up in the passageway 180 to such an extent that its corresponding valve member 198 would move forwardly to open its associated inlet port 192 whereby the inlet ports on both sides of the motor would be open and consequently the motor would stall. Thus, the high pressure fluid within the passageway 180 is allowed to escape through the passageways 161 and 162 and exhaust into the atmosphere through the annular clearance provided between the sleeve 158 and the valve body 152 and through the bayonet slot 174. Similarly, when the push-button 165 is depressed inwardly the passageway 162 and slot 174 permit the high pressure seepage fluid within the passageway 182 to escape into the atmosphere.

It becomes apparent that the distinction between the embodiment of the control valve system shown in FIGS. 8–10 and the control valve system shown in the first embodiment of FIGS. 2–6, is that, in the second embodiment, all of the high pressure fluid which rotates the motor flows through the push button reversing valve 154, whereas only a small portion of the high pressure fluid flows through the push button reversing valve 22 of the first embodiment. On the other hand, each tool includes a pair of axially extending valve members which alternately open and close the inlet port corresponding to one direction of rotation and the recompression exhaust port corresponding to the opposite direction of rotation. As a result of this novel valve arrangement, by simply actuating a single push button valve button, the opening and closing of four separate ports leading to and from the motor are simultaneously controlled. As a result, the direction of rotation of the vane-type fluid motor is easily and conveniently changed and, in addition, the motor can operate at maximum power output in either direction. Furthermore, in both embodiments, the valve system for reversing the motor is located downstream of either the automatic or manual start and stop control valve. This feature, also mentioned above, eliminates the leakage of high pressure fluid when the tool is not in use but is connected to a fluid pressure supply line. As a result, the valve system is constructed without the need of O-ring seals or the like for preventing leakage of fluid between the valve members and their corresponding valve chambers.

While the forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. A fluid operated rotary power tool having a servo valve system for selectively reversing the direction of rotation, comprising a housing having a pressure fluid supply conduit formed therein, a rotary fluid motor mounted within said housing and including means defining main exhaust ports, said motor having an inlet port and a recompression exhaust port for right hand rotation and corresponding inlet and recompression exhaust ports for left hand rotation, a pair of valves mounted within said housing and connected for controlling the flow of fluid through said ports, each of said valves including a valve member arranged for closing said inlet port corresponding to one direction of rotation while simultaneously opening said recompression exhaust port corresponding to the opposite direction, bias means acting on each said valve member for urging said member to a closed position closing its related said inlet port and opening its related said recompression exhaust port, passage means for conducting pressure fluid to each said valve for over-powering said bias means to open its said inlet port for fluid communication with said supply conduit, and a push button reversing valve in fluid communication with said supply conduit and for bleeding pressure fluid from said supply conduit selectively to either of said valves for assisting said bias means and to prevent supply fluid from opening said inlet port and from closing said exhaust port.

2. A fluid operated rotary power tool having a servo valve system for reversing the direction of rotation, comprising a housing having a fluid inlet conduit formed therein, a start valve for controlling the flow of fluid through said inlet conduit, a rotary fluid motor mounted within said housing and including a hollow cylinder which encloses an eccentrically mounted sliding vane-type rotor, a pair of longitudinally extending valve chambers formed within the wall of said cylinder and spaced circumferentially thereof from each other, means defining a separate port on each side of said cylinder, said ports being operable alternatively as an inlet to said motor to produce rotation of said motor in forward or reverse, passage means defined by each said chamber and connected to said port and passage means extending from said start valve to said valve chambers, a valve member slidably mounted in each of said valve chambers and having means to open and close its corresponding passage means, spring bias means in each of said chambers tending to urge said valve members to a closed position against the pressure of supply fluid in said passage means, and a push button reversing valve mounted in said housing and connected to bleed pressure fluid from said supply conduit selectively to either of said valve chambers for equalizing the fluid pressure on the valve member therein whereby said spring means can move that valve member to its closed position while pressure fluid is supplied to said motor through the other valve chamber and its corresponding port.

3. A fluid operated rotary power tool having a servo valve system for selectively reversing the direction of rotation, comprising a housing including a handle having a fluid supply conduit formed therein, a vane-type rotary fluid motor mounted within said housing, said motor having means defining an inlet port and a recompression exhaust port for right hand rotation and corresponding inlet and recompression exhaust ports for left hand rotation, a pair of longitudinally extending valves mounted within said housing for controlling the flow of fluid through said ports, each of said valves including a valve member arranged for alternately opening and closing said inlet port corresponding to one direction of rotation and said recompression exhaust port corresponding to the opposite direction, spring bias means acting on one end of each said valve member for urging said member to a closed position closing its related said inlet port and opening said recompression exhaust port, passage means for conducting pressure fluid to the opposite end of each said valve member for over-powering said spring bias means to open its said inlet port for fluid communicating with said supply conduit, and a push button reversing valve mounted within said housing and having means for bleeding pressure fluid from said supply conduit selectively to either of said valves for assisting said spring bias means to prevent supply fluid acting on the opposite end from opening said inlet port corresponding to one direction and from closing said exhaust port corresponding to the opposite direction.

4. A fluid operated rotary power tool having a servo valve system for reversing the direction of rotation, comprising a housing including a handle having a fluid inlet conduit formed therein, a start valve for controlling the flow of fluid through said inlet conduit, a rotary fluid motor mounted within said housing and including a hollow cylinder enclosing an eccentrically mounted sliding vane-type rotor, a pair of axially extending cylindrical valve chambers formed within the wall of said cylinder and spaced circumferentially apart from each other, means defining an inlet port and a recompression exhaust port leading to each of said valve chambers from the interior of said cylinder, a cylindrical valve member slidably mounted in each of said valve chambers and having means to open and close alternately said inlet port and said exhaust port, a compression spring spaced in each of said chambers urging said valve members to close said inlet port and to open said exhaust port, passage means for conducting supply fluid to each said chamber for urging said valve member to close said exhaust port by overcoming said spring and simultaneously opening the inlet port thereof, and a push button reversing valve mounted in said housing and connected by passageways for bleeding fluid from said supply conduit when said start valve is opened selectively to either of said valve chambers for assisting said spring means and preventing the fluid pressure in said passage means from overcoming the force of said spring to hold the corresponding inlet port closed and the exhaust port open.

5. A fluid operated rotary power tool having a servo valve system for reversing the direction of rotation, comprising a housing having a fluid inlet conduit formed therein, a start valve for controlling the flow of fluid through said inlet conduit, a rotary fluid motor mounted within said housing and including a hollow cylinder which encloses an eccentrically mounted sliding vane-type rotor, a pair of longitudinally extending valve chambers formed within the wall of said cylinder and spaced circumferentially thereof from each other, means defining an inlet port and a recompression exhaust port on each side of cylinder, said ports being operable to produce rotation of said motor in forward or reverse, passage means defined by each said chamber and connected to said corresponding inlet port and passage means extending from said start valve to said valve chambers, a valve member slidably mounted in each of said valve chambers and having means to open and close alternately its corresponding inlet port and recompression exhaust port, spring bias means in each of said chambers tending to urge said valve members to close said corresponding inlet port against the pressure of supply fluid in said passage means, and a push button reversing valve mounted in said housing and connected to bleed pressure fluid from said supply conduit selectively to either of said valve chambers for equalizing the fluid pressure on the valve member therein whereby said spring means can move that valve member to close its inlet port and open its recompression exhaust port while pressure fluid is supplied to said motor through the other valve chamber and its corresponding inlet port.

6. A fluid operated rotary power tool having a valve system for selectively reversing the direction of rotation, comprising a housing having a pressure fluid supply conduit formed therein, a rotary fluid motor mounted within said housing, said motor having an inlet port and a recompression exhaust port for right hand rotation and corresponding inlet and recompression exhaust ports for left hand rotation, a pair of axially extending valves mounted within said housing and connected for controlling the flow of fluid through said ports, each of said valves including a valve member arranged for closing said inlet port corresponding to one direction of rotation while simultaneously opening said recompression exhaust port corresponding to the opposite direction, bias means acting on each said valve member for urging said member to a closed position closing its related said inlet port and opening its related said recompression exhaust port, passage means for conducting pressure fluid to each said valve for overpowering said bias means to open its said inlet port for fluid communication with said supply conduit, and a push button reversing valve in fluid communication with said supply conduit for directing pressure fluid from said supply conduit selectively to either of said axially extending valves.

7. A fluid operated rotary power tool having a valve system for reversing the direction of rotation, comprising a housing having a fluid inlet conduit formed therein, a start valve for controlling the flow of fluid through said inlet conduit, a rotary fluid motor mounted within said housing and including a hollow cylinder which encloses an eccentrically mounted sliding vane-type rotor, a pair of longitudinally extending valve chambers formed within the wall of said cylinder and spaced circumferentially apart from each other, means defining a separate port on each side of said cylinder, said ports being operable alternatively as an inlet to said motor to produce rotation of said motor in forward or reverse, passage means defined by each said chamber and connected to said port and passage means extending from said start valve to said valve chambers, a valve member slidably mounted in each of said valve chambers and having means to open and close its corresponding passage means, spring bias means in each of said chambers tending to urge said valve members to a closed position, and a push button reversing valve mounted in said housing and connected to direct pressure fluid from said supply conduit selectively to either of said longitudinally extending valve chambers for controlling the direction of rotation of said motor.

8. A fluid operated rotary power tool having a valve system for reversing the direction of rotation, comprising a housing having a fluid inlet conduit formed therein, a start valve for controlling the flow of fluid through said inlet conduit, a rotary fluid motor mounted within said housing and including a hollow cylinder enclosing an eccentrically mounted sliding vane-type rotor, a pair of axially extending cylindrical valve chambers formed within the wall of said cylinder and spaced circumferentially apart from each other, means defining an inlet port and a recompression exhaust port leading to each of said valve chambers and having means to open and close drical valve member slidably mounted in each of said valve chambers and having means to open and close alternately said inlet port and said exhaust port, a compression spring spaced in each of said chambers urging said valve members to close said inlet port and to open said exhaust port, passage means for conducting supply fluid to each said chamber for urging said valve member to close said exhaust port by overcoming said spring and simultaneously opening the inlet port thereof, and a push button reversing valve mounted in said housing for directing fluid from said supply conduit when said start valve is opened selectively to either of said valve chambers for overcoming said spring and to open said inlet port corresponding to the desired direction of rotation.

References Cited by the Examiner
UNITED STATES PATENTS

| | | | |
|---|---|---|---|
| 2,261,204 | 11/1941 | Amtsberg | 173—168 |
| 2,376,519 | 5/1945 | Stacy | 91—461 |
| 2,611,391 | 9/1952 | Sainsbury | 137—596.15 |
| 2,886,997 | 5/1959 | Madsen | 173—169 |
| 2,939,432 | 6/1960 | Birdsall | 91—461 |
| 2,947,283 | 8/1960 | Roggenburk | 173—169 |
| 2,996,045 | 8/1961 | Burton | 91—461 |
| 3,093,360 | 6/1963 | Krouse | 173—169 |

MARTIN P. SCHWADRON, *Primary Examiner.*

B. L. ADAMS, *Assistant Examiner.*